United States Patent
Morooka

(10) Patent No.: US 7,976,666 B2
(45) Date of Patent: Jul. 12, 2011

(54) POORLY AIR-PERMEABLE RUBBER LAMINATE COMPOSED OF POORLY AIR-PERMEABLE RESIN AND RUBBER COMPOSITION, AND METHOD FOR PRODUCTION THEREOF

(75) Inventor: Naoyuki Morooka, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 698 days.

(21) Appl. No.: 12/088,607

(22) PCT Filed: Sep. 29, 2006

(86) PCT No.: PCT/JP2006/320022
§ 371 (c)(1),
(2), (4) Date: Mar. 28, 2008

(87) PCT Pub. No.: WO2007/037541
PCT Pub. Date: Apr. 5, 2007

(65) Prior Publication Data
US 2010/0147431 A1    Jun. 17, 2010

(30) Foreign Application Priority Data
Sep. 30, 2005 (JP) .................................. 2005-288219

(51) Int. Cl.
*B32B 27/28* (2006.01)

(52) U.S. Cl. ..... 156/247; 152/510; 156/344; 156/308.2; 156/325; 156/236; 156/309.6

(58) Field of Classification Search ............ 156/247, 156/236, 344, 308.2, 325, 309.6; 152/510
See application file for complete search history.

(56) References Cited

U.S. PATENT DOCUMENTS 5,992,486 A * 11/1999 Katsuki et al. ................ 152/510
6,079,465 A *  6/2000 Takeyama et al. ........... 152/510

FOREIGN PATENT DOCUMENTS

| JP | 5-295119 | 11/1993 |
| JP | 7-118471 | 5/1995 |
| JP | 2002-52904 | 2/2002 |
| JP | 2002079804 | 3/2002 |
| JP | 2004255937 | 9/2004 |

* cited by examiner

*Primary Examiner* — Khanh Nguyen
*Assistant Examiner* — Margaret Squalls
(74) *Attorney, Agent, or Firm* — Connolly Bove Lodge & Hutz LLP

(57) ABSTRACT

A method for producing a laminate (E) of a low air permeable resin/rubber composition comprising:
  laminating a laminate (D) of a low air permeable resin (A) layer having an air permeation coefficient of $1.0 \times 10^{-12}$ cc·cm/cm$^2$·sec·cmHg or less and an average thickness d (μm) of $0.05 < d < 5$ and a thermoplastic resin composition (B) layer with a rubber composition (E) layer so as to form (B)/(A)/(E), followed by vulcanization, and
  peeling off only the thermoplastic resin composition (B) from the laminate, as well as the laminate thereof.

10 Claims, No Drawings

POORLY AIR-PERMEABLE RUBBER LAMINATE COMPOSED OF POORLY AIR-PERMEABLE RESIN AND RUBBER COMPOSITION, AND METHOD FOR PRODUCTION THEREOF

RELATED APPLICATIONS

This application is a national stage application (under 35 U.S.C. §371) of PCT/JP2006/320022 filed Sep. 29, 2006, which claims benefit of Japanese application 2005-288219 filed Sep. 30, 2005, disclosure of which is incorporated herein by reference.

TECHNICAL FIELD

The present invention relates to a low air permeable rubber laminate and a method for producing the same, more specifically relates to a low air permeable rubber laminate having a superior air barrier property and durability comprised of a layer of a rubber composition on which a low air permeable resin layer having an average thickness greater than 0.05 μm and less than 5 μm is laminated, a method for producing the same and a product obtained therefrom.

BACKGROUND ART

It has been known in the past to cover a layer of a rubber composition with a layer (or film) of a thermoplastic (or thermosetting) resin to obtain a laminate having functions derived from that resin. As an example, various attempts have been made to coat a rubber composition with a film having a low air permeability and to use this as an inner liner layer of a pneumatic tire. Recently, for example, Japanese Patent Publication (A) No. 2002-79804 proposes the use of an electron beam cross-linked polyvinyl alcohol, ethylene-vinyl alcohol copolymer, etc. as a gas barrier layer, which is then laminated on an elastomer auxiliary layer. The resultant laminate is used as the inner liner layer of a pneumatic tire. The thickness of this gas barrier layer is defined as being 30 μm or less, but the examples only describe the case of a thickness of EVOH of 20 μm. EVOH is an extremely hard resin having a tensile modulus of elasticity of 2 to 3 GPa, and therefore, in the case of a thickness of 20 μm, if stretched, necking deformation occurs and, due to stress concentration, easy breakage occurs. For this reason, due to repeated dynamic strain, cracks easily occur, peeling occurs from cracks, and other problems arise. Further, Japanese Patent Publication (A) No. 2004-255937 describes a support, and a pneumatic run flat tire, using a single layer of an electron beam cross-linked polyvinyl alcohol or ethylene-vinyl alcohol copolymer having a thickness of 5 to 100 μm, as a gas barrier layer.

DISCLOSURE OF THE INVENTION

Note that, as a method of coating a thin film of a low air permeable resin (A) on a rubber composition layer, there is the method of coating a solution or emulsion of the resin (A) on the rubber composition layer. This method has no problems when coating a relatively thick film of such as, for example, 10 μm or more, but it is difficult to control the uniformity of a thin film having a thickness of, for example, thinner than 5 μm, more particularly 3 μm or less. Further, there is the problem that the number of steps such as coating a primer for imparting bondability with the rubber composition layer, drying of the solvent, etc. is increased. Further, when a rubber composition requiring a vulcanization step is coated, in order to give the separability from the bladder rubber, it is necessary to coat the laminate surface with a release agent, followed by vulcanizing the same. At this time, the coating layer is liable to break. Therefore, there is the problem that it is not possible to impart a sufficient gas barrier property.

Accordingly, an object of the present invention is to provide a low air permeable rubber laminate comprised of a layer of a low air permeable resin (A) having a thickness of less than 5 μm, uniformly laminated on a layer of a rubber composition, capable of solving the above problems and a production method thereof and the product thereof.

In accordance with the present invention, there is provided a low air permeability rubber laminate (E) comprising a low air permeable resin (A) layer having an air permeation coefficient of $1.0 \times 10^{-12}$ cc·cm/cm$^2$·sec·cmHg or less and an average thickness d (μm) of $0.05 < d < 5$, laminated to one surface of a rubber composition (D) layer.

In accordance with the present invention, there is further provided a method for producing a low air permeability rubber laminate (E) comprising a rubber composition (E) layer laminated, at one surface thereof, with a low air permeable resin (A) layer comprising stacking and vulcanizing a laminate (D) of a low air permeable resin (A) layer having an air permeation coefficient of $1.0 \times 10^{12}$ cc·cm/cm$^2$·sec·cmHg or less and an average thickness d (μm) of $0.05 < d < 5$ and a thermoplastic resin composition (B) layer in a quasi-bonded state with the (A) layer and having a peeling strength from the (A) layer at room temperature of 0.001 to 10N/mm with a rubber composition (E) layer to so as to form a laminate of (B)/(A)/(E), followed by vulcanization such that the peeling strength between the low permeability resin (A) layer/the rubber composition (E) layer after vulcanization is larger than the peeling strength between the (A) layer/(B) layer, and peeling off only the thermoplastic resin composition (B) from the laminate.

The low air permeable resin (A) has a high Young's modulus, and, therefore, when laminated on the rubber, which receives repeated dynamic deformation, material breakage of the resin and the resin/rubber interfacial peeling occur. Contrary to this, according to the present invention, in a laminate comprised of a thin film of a low air permeable resin having a thickness of less than 5 μm, laminated on a layer of a rubber composition, bending cracks are difficult to occur, flexing fatigue resistance is superior, and interfacial separation is difficult to occur. In particular, when an ethylene-vinyl alcohol copolymer, which has the lowest air permeability among all resins, is used, even a thin film having a thickness of less than 5 μm has a gas barrier property sufficient for use as the inner liner of a pneumatic tire and the weight of the tire can be remarkably reduced.

BEST MODE FOR CARRYING OUT THE INVENTION

The singular forms ("a", "an", and "the") used in the Description and attached Claims should be understood as including the plural form except when otherwise clear from the context.

The inventors engaged in research to solve the above problems and, as a result, found that, by laminating and vulcanizing a two- or three-layer coextruded laminate (D) of a thermoplastic resin composition (B)/low air permeability resin (A)/optional adhesive (C) with a layer of a rubber composition (E), then peeling off the thermoplastic resin composition (B) layer, it is possible to uniformly coat a thin film of the low air permeable resin (A) layer having a thickness of less than 5 μm on the layer of the rubber composition (E), found that this low air permeable rubber laminate (F) has superior properties (e.g., gas barrier property and dynamic properties), whereby the present invention has been completed.

If the thickness of the low permeable resin (A) layer having an air permeation coefficient of $1.0\times10^{-12}$ cc·cm/cm$^2$·sec·cmHg or less (determined according to JIS K7126 (test gas: air (N$_2$:O$_2$=8:2), 30° C.), the same hereinbelow) is less than 5 μm, preferably 1 to 3 μm, it is possible to remarkably improve the gas barrier property such as oxygen, ozone, without sacrificing the dynamic properties (e.g., elongation at break, tensile and compressive set, etc.) of the rubber. For this reason, since the oxidation degradation of the rubber is remarkably decreased, the invention can be suitably applied to the side rubber etc. of tires, in addition to the inner liner. Further, a thin film of a low air permeable resin (A) having a thickness of less than 5 μm has flexing fatigue resistance, and, therefore, the low permeable rubber laminate (E) can be suitably used, even as one layer of, for example, an inner layer, intermediate layer and outer layer of a hose, where flexing fatigue resistance and gas barrier property are essential.

That is, according to the present invention, by laminating and, after the lamination, vulcanizing, a laminate (D) of a low air permeable resin (A) layer having an air permeation coefficient of $1.0\times10^{-12}$ cc·cm/cm$^2$·sec·cmHg or less, preferably 0.001 to $0.1\times10^{-12}$ cc·cm/cm$^2$·sec·cmHg and having an average thickness d of 0.05<d<5 μm, preferably 1 to 3 μm and a thermoplastic resin composition (B) layer in a quasi-bonded state with the (A) layer (that is, a state where the two layers are bonded in the state of ordinary use, but when separating the two layers, they can be easily separated by just pulling by hand and cannot be re-bonded by just placing them together under simple pressing) and having a peeling strength at room temperature with the (A) layer of 0.001 to 10N/mm, preferably 0.01 to 1N/mm (determined according to JIS6256, the same hereinbelow), with a layer of a rubber composition (E) so as to form a laminate of (B)/(A)/(E), in this order, by selecting (A), (B) and (E) so that the peeling strength between the low air permeable resin (A) layer/the rubber composition (E) layer after vulcanization becomes larger than the peeling strength of the (A) layer/the (B) layer. Thereafter, only the thermoplastic resin composition (B) layer is peeled off from the (A) layer of the laminate, it is possible to obtain a low air permeable rubber laminate (F) comprising the rubber composition (E) layer on one surface of which the (A) layer is coated (or laminated).

The laminate (D) of the low air permeable resin (A) layer and the thermoplastic resin composition (B) layer can, for example, be a multilayer co-extruded or multilayer inflated molded article of (A) and (B). This procedure is generally used in this technical field. The present invention can also utilize this general procedure.

As the resin usable, as the low air permeable resin (A), in the present invention, polyolefin ketone (POK), polyvinyl alcohol (PVA), ethylene-vinyl alcohol (EVOH) and Nylon MXD6 (i.e., polycondensates of meta-xylene diamine and adipic acid) may be mentioned. Among these, from the viewpoint of the balanced melt moldability of the gas barrier property and the flexibility, an ethylene-vinyl alcohol copolymer is preferable. Among the ethylene-vinyl alcohol copolymers, those having an ethylene composition ratio of 50 mol % or less is more preferable from the viewpoint of the heat resistance (or melting point) and the gas barrier property.

In the present invention, the resin composition usable, as the thermoplastic resin composition (B), is preferably a composition containing at least one resin of polyamide resins and polyester resins. As the specific resin forming the thermoplastic resin composition (B), at least one resin of, for example, Nylon 6, Nylon 66, Nylon 6.66, Nylon 6.10, Nylon 6.12, Nylon 46, Nylon 11, Nylon 12, polyethylene terephthalate (PET), polybutylene terephthalate (PBT), polyethylene naphthalate (PEN), etc. may be mentioned. From the viewpoint of the release property (i.e., small peeling strength) from the (A) layer, the use of Nylon 11 and Nylon 12 is particularly preferred.

The rubber component forming the rubber composition (E), usable in the present invention is not particularly limited. Any rubber material generally used as rubber for a tire in the past can be used. As such a rubber, for example, diene-based rubber such as natural rubber (NR), polyisoprene rubber (IR), polybutadiene rubber (BR), styrene-butadiene copolymer rubber (SBR); halogenated butyl rubber, ethylene-propylene copolymer rubber, etc., to which compounding agents such as carbon black, a process oil, vulcanization agent is added.

As the adhesive (C) optionally usable in the present invention, modified styrene copolymers may be mentioned. Specifically, any adhesive used for a Nylon-based thermoplastic elastomer in the past comprising, a styrene-ethylene-propylene copolymer, styrene-ethylene-butadiene-styrene copolymer, styrene-ethylene-butadiene copolymer, or styrene-butadiene-styrene copolymer having a functional group such as an epoxy group, hydroxyl group, amino group, carboxyl group, acid anhydride group, and a vulcanization accelerator, vulcanization agent and tackifier (see Japanese Patent Application Nos. 2003-208227 and 2004-025782) may be mentioned. The application methods and the amounts applied may also be made as in the past.

The low air permeable rubber laminate (F) according to the present invention can be used for the inner liner of a pneumatic tire, the side parts of a pneumatic tire, a low permeability hose, etc. The production methods thereof are not particularly limited. The conventional general methods may be used.

The resin composition and rubber composition of the present invention may further include, in addition to the above components, any additives conventionally used for these compositions, for example, carbon black or silica or another filler, a vulcanization or cross-linking agent, a vulcanization or cross-linking accelerator, various types of oils, an antioxidant, a plasticizer, or other additive. These additives may be mixed by a general method to obtain a composition for vulcanization or cross-linking. The amounts of these vulcanization agents may be made the conventional general amounts so long as the object of the present invention is not adversely affected.

EXAMPLES

Examples will now be used to further explain the present invention, but the scope of the present invention is by no means limited to these Examples.

Examples 1 to 3 and Comparative Examples 1 to 3

Preparation of Laminate (D)

A three-layer dies-equipped inflation molding machine was used to prepare cylindrical laminates (D) of a thermoplastic resin composition (B)/low air permeable resin (A)/adhesive (C) as shown in Table I, Table II, Table III and Table IV. As Comparative Example 3, a laminate (D) composed of two layers of a thermoplastic resin composition (B)/low air permeable resin (A) was prepared. Further, as Comparative Example 4, a laminate (D) composed of two layers of Nylon 11 (BESNO TL)/adhesive was prepared.

<Evaluation as Tire Inner Liner>

The prepared laminates (D) were used, instead of inner liners, to fabricate tires (size: 165SR13 (rim 13×4½-J)) by a general method. After preparing the tires, the (B) layers were peeled off, whereby the tires having inner liner layers were obtained, where the innermost surfaces of the tires were coated with an ethylene-vinyl alcohol copolymer. These tires were subjected to indoor tire tests and evaluated for air leakage.

Evaluation and Test Methods

Measurement of Peeling Strength

The peeling strength between (A)/(B) was measured according to JIS6256 after laminating and vulcanizing the (B)/(A)/adhesive (C)/rubber composition (E) in this order, sufficiently strengthening the bonding strength between (A)/rubber composition, and establishing a state enabling (A)/(B) to be peeled apart.

In the measurement of the peeling strength between (A)/rubber composition (E), when the peeling strength between (A)/(B) is weaker than that between (A)/rubber composition (E), (A)/(B) is peeled apart, and, therefore, the measurement is not possible in some cases. Accordingly, the peeling strength of (A)/rubber composition (E) was found by preparing a two-layer inflation laminate of (A)/adhesive (C), then laminating and vulcanizing (A)/binder (C)/rubber composition (E) in this order and peeling apart (A)/rubber composition (E).

Indoor Tire Evaluation

The prepared 165SR13 steel radial tires (rim 13×4½-J) were mounted on a 1500 cc class passenger car with an air pressure of 200 kPa, given a load equivalent to that when carrying four passengers (65 kg/passenger), and run on an actual road for 20,000 km. After driving, the tires were removed from the rims and the (A) layers at the insides of the tires were visually examined. Tires with cracks in the (A) layer and tires with peeling blistering of the (A) layer were judged as failing, while those without peeling blistering were judged as passing.

Judgment Method

Good: Case where the (A) layer does not exhibit any cracks and peeling

Poor: Case where (A) layer exhibits cracks and peeling

Air Leakage

165SR13 steel radial tires (rim 13×4½-J) were allowed to stand under conditions of an initial pressure of 200 kPa and no-load at room temperature of 21° C. for three months. The pressure was measured each measurement interval of four days. This was regressed to a function of the measurement pressure $P_t$, initial pressure $P_0$ and days elapsed t $$P_t/P_0 = \exp(-\alpha t)$$

to find the α value. The α thus obtained was used and t=30 was entered into the following equation:

$$\beta = [1 - \exp(-\alpha t)] \times 100$$

to obtain the β value. This β value was used as the rate of drop in pressure per month (air leakage rate) (%/month).

Air Leakage Judgment Criteria

Good: air leakage<2.5%/month

Fair: 2.5%/month<air leakage<4.0%/month

Poor: air leakage>4.0%/month

TABLE I

Low Air Permeable Resin (A)

| Material | Product name | Manufacturer | Air permeation coefficient ($\times 10^{-12}$ cc · cm/cm$^2$ · s · cmHg) |
|---|---|---|---|
| EVOH (ethylene-vinyl alcohol copolymer) | Eval L171B | Kuraray | 0.01 |
| EVOH (modified ethylene-vinyl alcohol copolymer) | Eval SP521B | Kuraray | 0.02 |
| PA11 (Nylon 11) | Rilsan BESNO TL | Arkema | 10 |

TABLE II

Thermoplastic Resin

| Material | Product name | Manufacturer |
|---|---|---|
| PA6.66 (6.66 copolymer nylon) | UBE 5033B | Ube Industry |
| PA11 (11 Nylon) | Rilsan BESTNOTL | Atofina |
| PA12 (12 Nylon) | UBESTA 3030XA | Ube Industry |
| Mah-EB (anhydrous maleic acid modified ethylene-butene copolymer) | MA8510 | Mitsui CHemical |

TABLE III

Thermoplastic Resin Composition (B)

| Thermoplastic resin material*[1] | Thermoplastic resin composition (B) (wt %) | | |
|---|---|---|---|
| | B1 | B2 | B3 |
| 5033B (PA6.66) | 40 | — | — |
| BESNOTL (PA11) | 50 | 45 | — |
| 3030XA (PA12) | — | — | 45 |
| MA8510 (Mah-EB) | 10 | 55 | 55 |

*[1]See Table II

TABLE IV

Binder (C)

| Material | Binder composition (parts by weight) |
|---|---|
| ESBS*[1] | 100 |
| Tackifier*[2] | 30 |
| Stearic acid*[3] | 1 |
| Peroxide*[4] | 2 |
| Zinc White*[5] | 0.5 |
| Total [phr] | 133 |

*[1]Epoblend AT501 (Daicel Chemical Industrial)
*[2]YS Resin D105 (Yasuhara Chemical)
*[3]Beads Stearate (NOF Corporation)
*[4]Parkadox 14/40C (Kayaku Akzo)
*[5]Zinc White No. 3 (Seido Chemical Industry)

TABLE V

Inner Liner Evaluation

|  | Comp. Ex. 1 | Ex. 1 | Ex. 2 | Ex. 3 | Comp. Ex. 2 | Comp. Ex. 3 | Comp. Ex. 4 |
|---|---|---|---|---|---|---|---|
| Thermoplastic resin composition (B) | B1 | B2 | B3 | B3 | B2 | B2 | — |
| (B) layer gauge (μm) | 100 | 100 | 100 | 100 | 100 | 100 | 0 |
| Low air permeable resin(A) | L171B | L171B | SP521B | L171B | L171B | L171B | BESNO TL |
| (A) layer gauge (μm) | 1 | 0.5 | 1 | 3 | 12 | 12 | 30 |
| Binder | Yes | Yes | Yes | Yes | Yes | No | Yes |
| (B)/(A) peeling strength (N/mm) | 100 (B) material breakage | 0.05 | 0.04 | 0.03 | 0.05 | 0.05 | — |
| (A)/rubber peeling strength (N/mm) | 10 | 10 | 10 | 10 | 10 | 0.01 | 10 |
| Indoor tire evaluation | (B) layer cracks | No cracks | No cracks | No cracks | (A) layer crack and peeling | — | (A) layer crack |
| Durability judgment | Poor | Good | Good | Good | Good | — | Poor |
| Air leakage evaluation | Good | Good | Good | Good | Good | — | Poor |

In Comparative Example 1, (B)/(A) was not able to be peeled apart, and, therefore, the indoor tire test was conducted, while leaving the (B) layer laminated.

In Comparative Example 3, a laminate (D) composed of two layers of a thermoplastic resin composition (B)/low air permeable resin composition (A) was used. The (A)/rubber peeling strength was less than the (B)/(A) peeling strength, and, therefore, the (A) layer was not coated on the rubber layer.

Examples 4 to 6 and Comparative Examples 5 to 7

Evaluation as Tire Side Part

As shown in Table VI, each laminate (D) layer was laminated on a side rubber compound, then used to prepare a tire by a conventional general method. After tire vulcanization, the (B) layer was peeled off, whereupon a tire having an EVOH thin film coated on the tire sides was obtained. The results are shown in Table VI.

Evaluation Method

Peeling strength: Same as the case of the inner liner mentioned above

Oxygen degradation evaluation: The prepared 165SR13 steel radial tires (rim 13×4½-J) were mounted on a 1500 cc class passenger car with an air pressure of 120 kPa, given a load equivalent to that when carrying four passengers (65 kg/passenger), and run on for 5,000 km while exposing the two sides of the tires to ozone. After driving, the formation of ozone cracks at the side parts was visually checked.

Judgment Method

Good: Case where there are no ozone cracks from the side part

Poor: Case where ozone cracks are seen from the side part

TABLE VI

|  | Comp. Ex. 5 | Ex. 4 | Ex. 5 | Ex. 6 | Comp. Ex. 6 | Comp. Ex. 7[*1] |
|---|---|---|---|---|---|---|
| Thermoplastic resin composition (B) | B1 | B2 | B3 | B3 | B2 | |
| (B) layer gauge (μm) | 100 | 100 | 100 | 100 | 100 | |
| Low air permeable resin(A) | L171B | L171B | SP521B | L171B | L171B | |
| (A) layer gauge (μm) | 1 | 0.5 | 1 | 3 | 12 | |
| Adhesive | Yes | Yes | Yes | Yes | Yes | |
| (B)/(A) peeling strength (N/mm) | 100 (B) material breakage | 0.05 | 0.04 | 0.02 | 0.05 | — |
| (A)/rubber peeling strength (N/mm) | 12 | 12 | 10 | 12 | 12 | — |
| Driving after oxygen degradation | (B) layer cracks | No cracks | No cracks | No cracks | (A) layer crack | Side rubber ozone cracks |
| Durability judgment | Poor | Good | Good | Good | Poor | Poor |

[*1]Comparative Example 7 was tested by an ordinary tire not using a laminate (C).

INDUSTRIAL APPLICABILITY

As explained above, according to the present invention, by making the thickness of the thin film of the low air permeable resin (A) having a thickness of less than 5 μm, the laminate comprising the thin film of the low air permeable resin (A) laminated on a rubber composition (E) is given resistance to flex cracking, superior flexing fatigue resistance and resistance to interfacial peeling. In particular, if using an ethylene-vinyl alcohol copolymer, which has the lowest air permeable among resins, even a thin film having a thickness of less than 5 μm, further 3 μm or less, can be given a gas barrier property sufficient for use, as an inner liner of a pneumatic tire, and therefore, the weight of the tire can be remarkably decreased. Further, if a thin film having a thickness of less than 5 μm, it is possible to remarkably improve the oxygen, ozone, and other gas barrier property, without adversely affecting the dynamic properties of the rubber (e.g., elongation at break, tensile and compressive set, etc.). Since the oxidation degradation of the rubber is remarkably decreased, this can be suitably used as side rubber etc. of a tire. Further, this can be suitably used even for a hose, where flexing fatigue resistance and gas barrier property are essential.

The invention claimed is:

1. A method for producing a laminate (F) of a low air permeable resin/rubber composition comprising a rubber composition (E) layer laminated, at one surface thereof, with a low air permeable resin (A) layer comprising:

laminating a laminate (D) of a low air permeable resin (A) layer having an air permeation coefficient of $1.0 \times 10^{-12}$ cc·cm/cm$^2$·sec·cmHg or less and an average thickness d (μm) of $0.05 < d < 5$ and a thermoplastic resin composition (B) layer in a quasi-bonded state with the (A) layer and having a peeling strength from the (A) layer at room temperature of 0.001 to 10N/mm with a rubber composition (E) layer to so as to form a laminate of (B)/(A)/(E), followed by vulcanization, such that the peeling strength between the low permeability resin (A) layer/the rubber composition (E) layer after the vulcanization is larger than the peeling strength between the (A) layer/the (B) layer; and peeling off only the thermoplastic resin composition (B) from the laminate.

2. A method for producing a laminate (F) of a low air permeable resin/rubber composition comprising a rubber composition (E) layer laminated, at one surface thereof, with a low air permeable resin (A) layer comprising:

laminating a three-layer laminate (D) comprised of a low air permeability resin (A) layer having an air permeation coefficient of $1.0 \times 10^{-12}$ cc·cm/cm$^2$·sec·cmHg or less and an average thickness d (μm) of $0.05 < d < 5$, a thermoplastic resin composition (B) layer in a quasi-bonded state with the (A) layer and having a peeling strength from the (A) layer at room temperature of 0.001 to 10N/mm, and an adhesive (C) laminated in the order of (B)/(A)/(C) with a rubber composition (E) layer so as to form a laminate of (B)/(A)/(C)/(E), followed by vulcanization such that the peeling strength between the low permeability resin (A) layer/the rubber composition (E) layer after the vulcanization is larger than the peeling strength between the (A) layer/(B) layer, and;

peeling off only the thermoplastic resin composition (B) from the laminate.

3. A method for producing a laminate (F) of a low air permeable resin/rubber composition as claimed in claim 1, wherein the laminate (D) is a multilayer coextruded or multilayer inflation molded article.

4. A method for producing a laminate (F) of a low air permeability resin/rubber composition as set forth in claim 1, wherein the low air permeable resin (A) is an ethylene-vinyl alcohol copolymer.

5. A method for producing a laminate (F) of a low air permeable resin/rubber composition as claimed in claim 1, wherein the ethylene ratio of the ethylene-vinyl alcohol copolymer is 50 mol % or less.

6. A method for producing a laminate (F) of a low air permeable resin/rubber composition as claimed in claim 1, wherein the thermoplastic resin composition (B) is at least one resin selected from the group consisting of a polyamide resins and polyester resins.

7. A method for producing a laminate (F) of a low air permeable resin/rubber composition as claimed in claim 1, wherein the thermoplastic resin composition (B) is at least one resin selected from the group consisting of Nylon 11 and Nylon 12.

8. A method for producing a laminate (F) of a low air permeable resin/rubber composition as claimed in claim 2, wherein the laminate (D) is a multilayer coextruded or multilayer inflation molded article.

9. A method for producing a laminate (F) of a low air permeability resin/rubber composition as set forth in claim 2, wherein the low air permeable resin (A) is an ethylene-vinyl alcohol copolymer.

10. A method for producing a laminate (F) of a low air permeability resin/rubber composition as set forth in claim 3, wherein the low air permeable resin (A) is an ethylene-vinyl alcohol copolymer.

* * * * *